(12) United States Patent
Kimura et al.

(10) Patent No.: US 7,911,101 B2
(45) Date of Patent: Mar. 22, 2011

(54) ELECTRIC MOTOR AND AN ACTUATOR HAVING THE SAME

(75) Inventors: Kiyoshi Kimura, Obu (JP); Shigeru Yoshiyama, Kariya (JP)

(73) Assignee: Denso Corporation, Kariya (JP)

( * ) Notice: Subject to any disclaimer, the term of this patent is extended or adjusted under 35 U.S.C. 154(b) by 252 days.

(21) Appl. No.: 12/203,359

(22) Filed: Sep. 3, 2008

(65) Prior Publication Data
US 2009/0058208 A1 Mar. 5, 2009

(30) Foreign Application Priority Data

Sep. 4, 2007 (JP) ................. 2007-229365

(51) Int. Cl.
*H02K 15/00* (2006.01)
*H02K 49/00* (2006.01)

(52) U.S. Cl. ............. 310/93; 310/51; 310/67 R; 310/83; 310/90; 310/91; 310/15; 310/90.5; 310/153

(58) Field of Classification Search .................... 310/51, 310/67 R, 83, 89, 90, 91, 93, 90.5, 153
See application file for complete search history.

(56) References Cited

U.S. PATENT DOCUMENTS

| | | | |
|---|---|---|---|
| 3,836,040 A * | 9/1974 | Paine et al. | 220/786 |
| 4,244,099 A * | 1/1981 | Haydon | 29/596 |
| 4,501,982 A * | 2/1985 | McMinn | 310/90 |
| 4,783,608 A * | 11/1988 | Gruber et al. | 310/90 |
| 4,910,423 A * | 3/1990 | Werber | 310/77 |
| 5,022,039 A * | 6/1991 | Karube et al. | 372/58 |
| 5,032,750 A * | 7/1991 | Hayashi | 310/83 |
| 5,406,180 A * | 4/1995 | Feller, Jr. | 318/372 |
| 5,504,381 A * | 4/1996 | Kato | 310/51 |
| 6,512,316 B2 * | 1/2003 | Obara et al. | 310/90 |
| 6,630,761 B1 * | 10/2003 | Gabrys | 310/90.5 |
| 6,710,489 B1 * | 3/2004 | Gabrys | 310/90.5 |
| 6,825,588 B2 * | 11/2004 | Gabrys et al. | 310/90.5 |
| 6,836,040 B2 * | 12/2004 | Watanabe et al. | 310/90 |
| 2001/0022478 A1 * | 9/2001 | Obara et al. | 310/90 |
| 2003/0184177 A1 * | 10/2003 | Enzinna | 310/93 |
| 2004/0162661 A1 * | 8/2004 | Kikuchi | 701/62 |
| 2005/0082922 A1 * | 4/2005 | Armiroli et al. | 310/68 D |
| 2005/0206254 A1 * | 9/2005 | Tsuge et al. | 310/68 B |
| 2006/0138880 A1 * | 6/2006 | Kimura et al. | 310/68 B |
| 2007/0103010 A1 * | 5/2007 | Kouzu et al. | 310/51 |
| 2007/0118252 A1 * | 5/2007 | Okazaki et al. | 700/254 |
| 2007/0144287 A1 | 6/2007 | Kimura et al. | |
| 2008/0016978 A1 * | 1/2008 | Nagano et al. | 74/473.18 |
| 2009/0058208 A1 * | 3/2009 | Kimura et al. | 310/83 |

* cited by examiner

*Primary Examiner* — Quyen Leung
*Assistant Examiner* — John K Kim
(74) *Attorney, Agent, or Firm* — Nixon & Vanderhye PC (57) ABSTRACT

In an electric motor of an SBW actuator, a rotor shaft is rotated upon energization of the motor. A rotor core is rotated integrally with the rotor shaft. A resilient member enables tilting or decentering of the rotor shaft upon application of a decentering force on the rotor shaft. A stator core contacts the rotor core when the rotor shaft is tilted or decentered.

10 Claims, 5 Drawing Sheets

ELECTRIC MOTOR AND AN ACTUATOR HAVING THE SAME

CROSS REFERENCE TO RELATED APPLICATION

This application is based on and incorporates herein by reference Japanese Patent Application No. 2007-229365 filed on Sep. 4, 2007.

BACKGROUND OF THE INVENTION

1. Field of the Invention

The present invention relates to an electric motor and an actuator having the same.

2. Description of Related Art

An electric motor, which drives a drive subject to rotate the same, is known.

When an excessive braking torque is generated in the electric motor, for example, at the time of locking of the drive subject, a mechanical damage may possibly be applied to components of the drive subject by an excessive rotational torque generated by the electric motor.

The above disadvantage will be illustrated by using an example of a shift range change apparatus of a shift-by-wire (SBW) type.

An automatic transmission of a vehicle includes a shift range change mechanism (including a parking change mechanism) and is shifted manually by a driver of the vehicle. However, lately, a shift range change apparatus, which changes the shift range change mechanism by an SBW actuator having an electric motor, is prevailing in the market (see, for example, Japanese Unexamined Patent Publication No. 2006-191709 corresponding to US 2006/0138880A1).

In the electric motor, when the temperature gets high, the electric resistance becomes large. In such a case, the drive current of the electric motor drops, and the output torque of the electric motor becomes small. Also, at the low battery voltage, the drive current drops, so that the output torque of the electric motor becomes small. Accordingly, in the high temperature and low battery voltage state, the drive current of the electric motor becomes minimum (high temperature×low voltage=minimum drive current).

Here, it is demanded that the electric motor of the shift range change apparatus generates the required torque even under the worst condition of "high temperature×low voltage state=minimum drive current".

However, when the required torque is ensured in the worst condition of "high temperature×low voltage=minimum drive current", a large rotational torque would be produced in an opposite condition of "low temperature×high voltage=maximum drive current".

Here, at the time of changing the shift range, the electric motor receives only the reaction force, which corresponds to the torque required for the changing of the shift range, from the drive subject (from the shift range change mechanism side). Thus, at the time of changing the shift range, the excessive rotational torque (excessive load) is not exerted on the rotor shaft of the electric motor independent of the temperature and the voltage.

However, when the drive subject is placed in the locked state under the condition of "low temperature×high voltage", the electric motor tries to drive the locked drive subject, and thereby an excessive rotational torque (excessive load) is applied to the drive subject. Therefore, a mechanical damage may possibly be applied to the components of the rotation transmission system (including a speed reducer), which is from the electric motor to the drive subject, or the components of the drive subject.

Specifically, in a known shift range change apparatus, an abutment control operation is executed to learn a reference position of the motor (one rotational position in a movable range of the electric motor) by moving and hitting a movable member of the drive subject to one end of a rotatable range.

When this abutment control operation is executed under the condition of "low temperature×high voltage", the excessive rotational torque of the electric motor may possibly be applied to the drive subject, and thereby the mechanical damage may possibly be applied to the components of the rotation transmission system from the electric motor to the drive subject or the components of the drive subject.

SUMMARY OF THE INVENTION

The present invention addresses the above disadvantage. According to one aspect of the present invention, there is provided an electric motor, which includes a rotor shaft, a rotatable member, a resilient member and a supportive contact member. The rotor shaft is rotated upon energization of the electric motor. The rotatable member is rotated integrally with the rotor shaft. The resilient member enables tilting or decentering of the rotor shaft upon application of a decentering force on the rotor shaft. The supportive contact member contacts the rotatable member when the rotor shaft is tilted or decentered.

BRIEF DESCRIPTION OF THE DRAWINGS

The invention, together with additional objectives, features and advantages thereof, will be best understood from the following description, the appended claims and the accompanying drawings in which:

FIG. 1A is a cross sectional view showing a support portion of a first bearing of an electric motor of an SBW actuator seen from an axial direction according to an embodiment of the present invention;

FIG. 1B is an axial cross-sectional view of the SBW actuator according to the embodiment;

DETAILED DESCRIPTION OF THE INVENTION

Now, with reference to FIGS. 1A to 4, a shift range change apparatus according to an embodiment of the present invention will be described.

In the shift range change apparatus, an SBW actuator 1 (see FIGS. 1A and 1B) drives a shift range change mechanism 3 and a parking change mechanism 4 (see FIG. 3) to change an operational state thereof. These change mechanisms 3 and 4 are installed to an automatic transmission 2 (see FIG. 2), which changes a speed of a rotational output of a vehicle engine (which may be either an internal combustion engine alone or a hybrid of an internal combustion engine+an electric motor).

Figure 2:
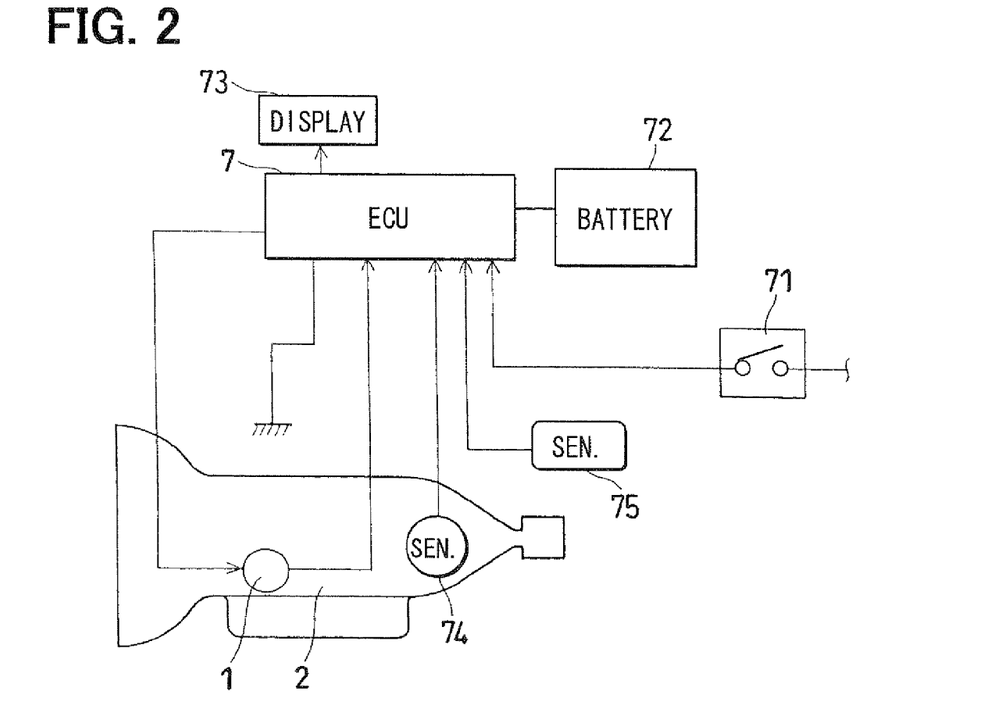
FIG. 2 is a schematic diagram showing a shift range change apparatus having the SBW actuator according to the embodiment.

The SBW actuator 1 is a servo mechanism, which drives the shift range change mechanism 3 and the parking change mechanism 4. As shown in FIG. 1B, the SBW actuator 1 includes a synchronous electric motor 5 and a speed reducer 6. The speed reducer 6 reduces a rotational speed of rotation of the motor 5 and outputs the rotation of the reduced speed. The rotation of the SBW actuator 1 (more specifically, the motor 5) is controlled by an SBW ECU 7, as shown in FIG. 2.

Specifically, in the shift range change apparatus, the shift range change mechanism 3 and the parking change mechanism 4 are driven through the speed reducer 6, by controlling a rotational direction, a rotational speed (i.e., the number of rotations per unit time) and a rotational angle of the motor 5 through the SBW ECU 7.

Next, the structure of the shift range change apparatus will be described in detail. In the following description, a right side and a left side of FIG. 1B correspond to a front side and a rear side, respectively, of the SBW actuator 1. However, it should be noted that these terms, i.e., the front side and the rear side are merely used for the descriptive purpose and are not related to an actual installation direction of the SBW actuator 1.

The motor 5 will be described with reference to FIGS. 1A and 1B.

The motor 5 of the present embodiment is a brushless switched reluctance (SR) motor, which does not use a permanent magnet. The motor 5 includes a rotor 11 and a stator 12. The rotor 11 is rotatably supported, and the stator 12 is coaxial with the rotor 11.

The rotor 11 includes a rotor shaft 13 and a rotor core 14 and is rotatably supported by a first bearing 15, which is disposed at the rear end of the rotor shaft 13, and a second bearing 16, which is disposed at the front end of the rotor shaft 13.

The second bearing 16 on the front side is a rolling bearing, which rotatably supports the front end (front end portion) of the rotor shaft 13 and is securely fitted into the inner peripheral surface of an output shaft 17 of the speed reducer 6. The output shaft 17, which supports the second bearing 16, is rotatably supported by a metal bearing 19, which is fitted to an inner peripheral surface of a front housing 18. That is, the front end of the rotor shaft 13 is rotatably supported through the metal bearing 19, the output shaft 17 and the second bearing 16, which are provided in the front housing 18.

The axial support interval of the metal bearing 19 is provided to overlap with the axial support interval of the second bearing 16, so that misalignment of the axis of the portion (the front end portion) of the rotor shaft 13, which is supported by the second bearing 16, is limited.

The first bearing 15 on the rear side is a rolling bearing, which rotatably supports the rear end (rear end portion) of the rotor shaft 13. A support structure of a rear housing 20, which supports the first bearing 15, will be discussed later.

The stator 12 includes a stator core 21 and excitation coils 22 of multiple phases, which are fixed in the housing (the front housing 18 and the rear housing 20). The excitation coils 22 generate a magnetic force upon energization thereof.

The stator core 21 is formed by stacking a plurality of thin plates and is fixed to the rear housing 20. More specifically, the stator core 21 includes a plurality of stator teeth (inwardly projecting salient poles), which radially inwardly project toward the rotor core 14 and are arranged one after another at predetermined angular intervals (e.g., at 30 degree intervals). Each of the stator teeth is provided with the corresponding excitation coil 22 for generating the magnetic force at each of the stator teeth. Energization of each excitation coil 22 is controlled by the SBW ECU 7.

The rotor core 14 is formed by stacking a plurality of thin plates and is securely press fitted to the rotor shaft 13. The rotor core 14 includes a plurality of rotor teeth (outwardly projecting salient poles), which radially outwardly project toward the stator core 21 and are arranged one after another at predetermined angular intervals (e.g., 45 degree intervals).

The SBW ECU 7 sequentially changes the energization position and the energization direction of the respective excitation coils 22 to sequentially change the active stator teeth, which magnetically attract the rotor teeth, so that the rotor 11 is rotated in one direction or the other direction.

Figure 4:
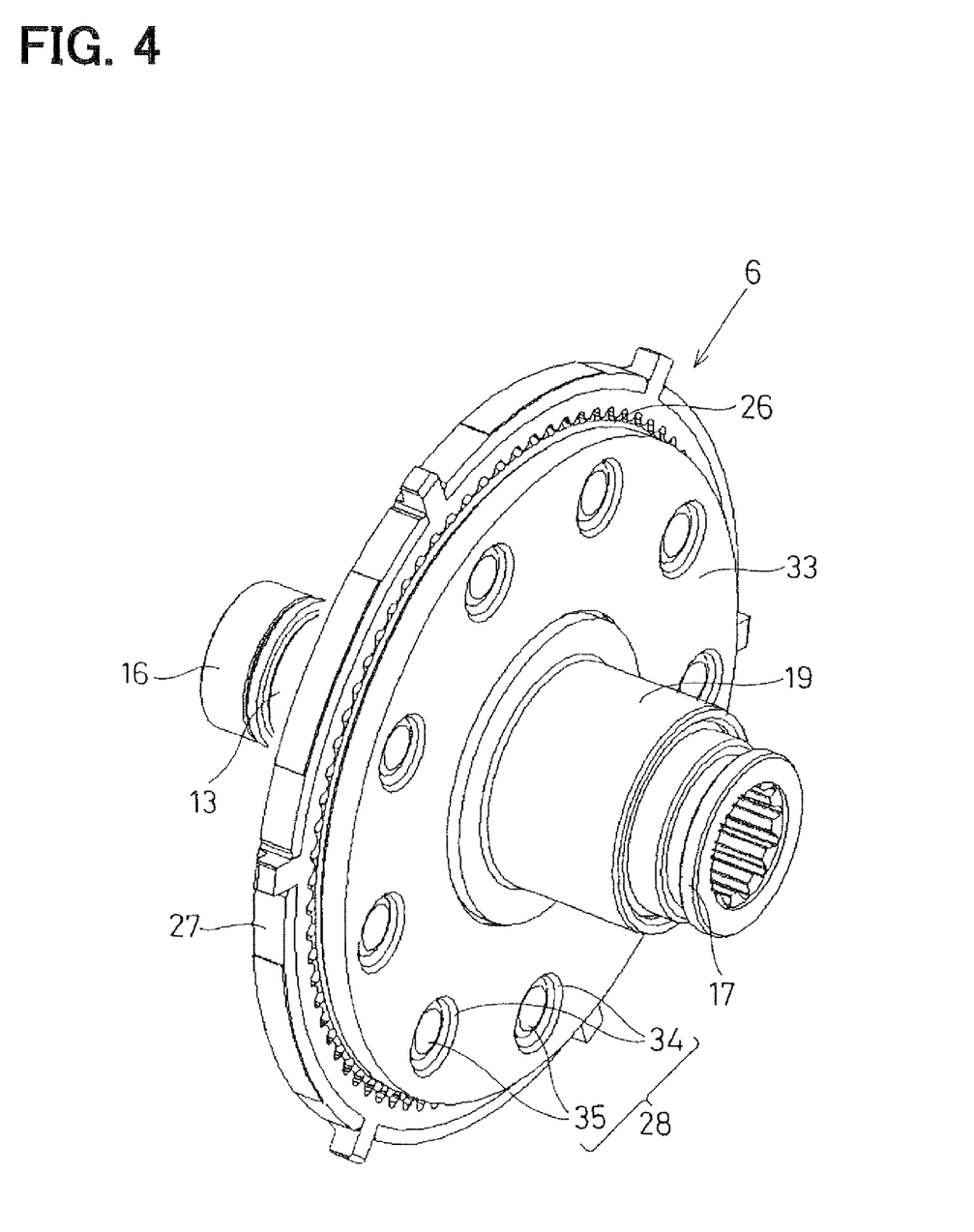
FIG. 4 is a perspective view of a speed reducer taken from a front side thereof according to the embodiment.

The speed reducer 6 will be described with reference to FIGS. 1A, 1B and 4.

The speed reducer 6 of the present embodiment is an inner gearing planetary gear speed reducer (a cycloid speed reducer), which is one of various types of planetary speed reducers. The speed reducer 6 includes a sun gear 26 (inner gear: externally toothed gear), a ring gear 27 (outer gear: internally toothed gear) and a transmitting device (a transmitting means) 28. The sun gear 26 is eccentrically rotatably installed to the rotor shaft 13 through an eccentric part 25, which is provided to the rotor shaft 13. The ring gear 27 is meshed with the sun gear 26, which is located radially inward of the ring gear 27. The transmitting device 28 transmits only a rotational force component of the sun gear 26 to the output shaft 17.

The eccentric portion 25 is a shaft, which is eccentrically rotated about a rotational center of the rotor shaft 13 to cause swing rotation of the sun gear 26. The eccentric portion 25 rotatably supports the sun gear 26 through a sun gear bearing 31, which is positioned radially outward of the eccentric portion 25.

As described above, the sun gear 26 is rotatably supported by the eccentric portion 25 of the rotor shaft 13 through the sun gear bearing 31. When the eccentric portion 25 is rotated, the sun gear 26 is rotated while being urged against the ring gear 27.

The ring gear 27 is fixed to the front housing 18.

The transmitting device 28 includes a plurality of inner pin holes 34 and a plurality of inner pins 35. The inner pin holes 34 are arranged one after another along a common imaginary circle on a flange 33, which rotates integrally with the output shaft 17. The inner pins 35 are formed in the sun gear 26 and are loosely fitted into the inner pin holes 34, respectively.

The inner pins 35 project from a front surface of the sun gear 26.

The inner pin holes 34 are formed in the flange 33, which is provided at the rear end of the output shaft 17. The rotation of the sun gear 26 is transmitted to the output shaft 17 through the engagement between each of the inner pins 35 and its corresponding inner pin hole 34.

With the above construction, when the rotor shaft 13 is rotated to eccentrically rotate the sun gear 26, the sun gear 26 is rotated at the reduced rotational speed, which is lower than that of the rotor shaft 13. Then, the rotation of the sun gear 26 at the reduced rotational speed is transmitted to the output shaft 17. The output shaft 17 is connected to a control rod 45 (described latter), which drives the shift range change mechanism 3 and the parking change mechanism 4.

Alternative to the above described construction of the present embodiment, the inner pin holes 34 may be formed in the sun gear 26, and the inner pins 35 may be provided in the flange 33.

Figure 3:
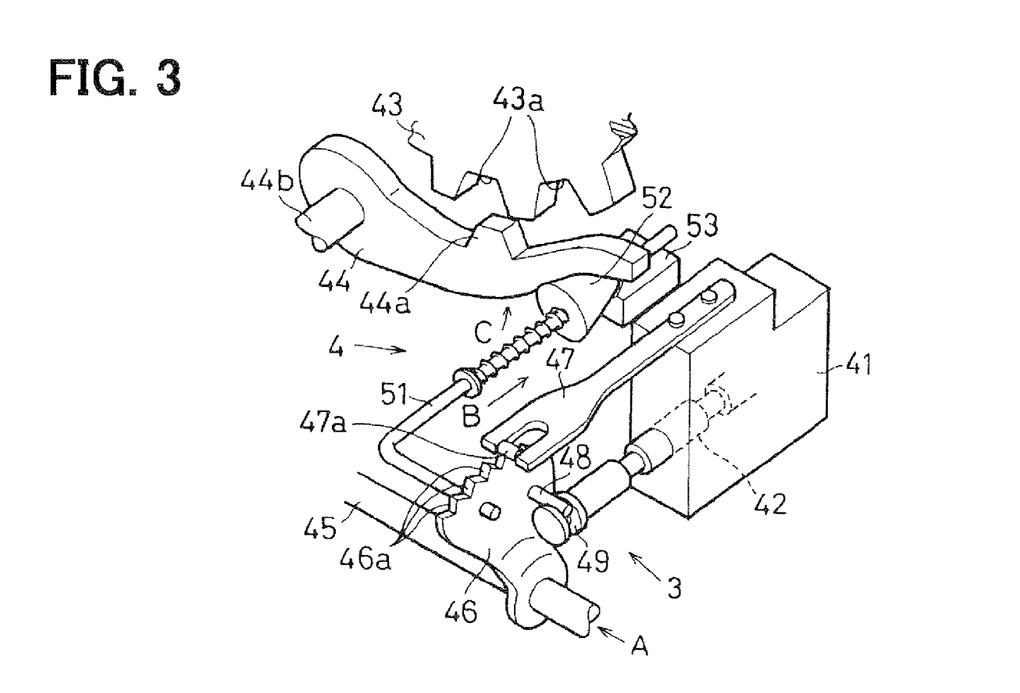
FIG. 3 is a perspective view illustrating a parking change mechanism and a shift range change mechanism according to the embodiment.

The shift range change mechanism 3 and the parking change mechanism 4 are driven to change its operational position by the output shaft of the SBW actuator 1 (specifically, the output shaft 17 of the speed reducer 6).

The shift range change mechanism 3 drives a manual spool valve 42 of a hydraulic valve body 41 to slide the manual spool valve 42 to an appropriate position, which corresponds to a shift range, so that an oil passage connected to a hydraulic clutch (not shown) of the automatic transmission 2, is changed to control an engaged state of the hydraulic clutch.

In the parking change mechanism 4, a park pole 44, which is rotatably supported by a fixing member (e.g., a housing of the automatic transmission 2), is engaged with and disengaged from a park gear 43, which is rotated synchronously with a drive shaft of the vehicle to change the operational state of the park gear 43 between an locked state (a parking state) and an unlocked state (a parking released state). Specifically, the parking change mechanism 4 is changed between the locked state and the unlocked through engagement and disengagement between a recess 43a of the park gear 43 and a protrusion 44a of the park pole 44. When the rotation of the park gear 43 is limited, driving wheels of the vehicle are locked through the drive shaft and a differential gear. Thereby, the vehicle is placed in the parking state.

A generally fan shaped detent plate 46 is fixed to the control rod 45, which is driven by the SBW actuator 1. The control rod 45 and the detent plate 46 are rotated together.

A plurality of recesses 46a is provided in a radially outer end (a generally fan shaped outer arcuate portion) of the detent plate 46. When an engaging portion 47a at a distal end of a detent spring 47, which is fixed to the hydraulic valve body 41 (or any other position in the interior of the automatic transmission 2), is engaged with the corresponding recess 46a, the current shift range is maintained. In the present embodiment, the detent mechanism, which uses the plate spring, is illustrated. Alternatively, any other detent mechanism, which uses, for example, a coil spring, may be used.

A pin 48, which drives the manual spool valve 42, is fixed to the detent plate 46.

The pin 48 is engaged with an annular groove 49, which is formed in an end of the manual spool valve 42. When the detent plate 46 is rotated by the control rod 45, the pin 48 is driven along an arcuate path. Thus, the manual spool valve 42, which is engaged with the pin 48, is moved linearly in an interior of the hydraulic valve body 41.

In a view taken in a direction of an arrow A in FIG. 3, when the control rod 45 is rotated in a clockwise direction, the pin 48 is driven in the clockwise direction through the detent plate 46. Thus, the pin 48 pushes the manual spool valve 42 toward the interior of the hydraulic valve body 41 to sequentially change an active hydraulic fluid passage in the hydraulic valve body 41 in an order of a hydraulic fluid passage of a D range, a hydraulic fluid passage of an N range, a hydraulic fluid passage of an R range and a hydraulic fluid passage of a P range. Thus, the shift range of the automatic transmission 2 is changed in the order of the D range, the N range, the R range and the P range.

On the other hand, when the control rod 45 is rotated in the reverse direction, the pin 48 pulls the manual spool valve 42 away from the hydraulic valve body 41 to change the active hydraulic fluid passage in the hydraulic valve body 41 in an order of the hydraulic fluid passage of the P range, the hydraulic fluid passage of the R range, the hydraulic fluid passage of the N range and the hydraulic fluid passage of the D range. Thus, the shift range of the automatic transmission 2 is changed in the order of the P range, the R range, the N range and the D range.

A park rod 51 is fixed to the detent plate 46 to drive the park pole 44. A conical portion 52 is provided in a distal end of the park rod 51.

The conical portion 52 is interposed between a protruded portion 53 of a housing of the automatic transmission 2 and the park pole 44. In the view taken in the direction of the arrow A in FIG. 3, when the control rod 45 is rotated in the clockwise direction (specifically, from the R range to the P range), the park rod 51 is driven through the detent plate 46 in a direction of an arrow B in FIG. 3 to push up the park pole 44 with the conical portion 52 of the park rod 51. Thus, the park pole 44 is rotated about a shaft 44b in a direction of an arrow C in FIG. 3. Therefore, the protrusion 44a of the park pole 44 is engaged with the opposed recess 43a of the park gear 43 to achieve the locked state (the parking state) of the parking change mechanism 4.

When the control rod 45 is rotated in the opposite direction (specifically, from the P range to the R range), the park rod 51 is pulled back in an opposite direction, which is opposite from the direction of the arrow B in FIG. 3. Thus, the urging force, which pushes up the park pole 44, is removed. The park pole 44 is always urged by a coil spring (not shown) in an opposite direction, which is opposite from the direction of the arrow C in FIG. 3. Thus, the protrusion 44a of the park pole 44 is pushed away from the opposed recess 43a of the park gear 43 to release the park gear 43 into a free state, and thereby the parking change mechanism 4 is placed into the unlocked state (the parking released state).

As shown in FIG. 1B, the SBW actuator 1 includes an encoder 60, which senses the rotational angle of the rotor 11 and is received in the housing (the front housing 18 and the rear housing 20) of the SBW actuator 1. The rotational angle of the rotor 11 is sensed with the encoder 60, so that the motor 5 can be rotated at a high speed without losing the synchronism of the motor 5.

The encoder 60 is of an incremental type and includes a magnet 61 and Hall ICs (e.g., a rotational angle sensing Hall IC, which senses a magnetic flux of the magnetic poles of the magnet 61, and an index signal Hall IC, which senses a magnetic flux that is generated every time one cycle of energization of the phases of the excitation coils 22 completes) 62. The magnet 61 is rotated integrally with the rotor 11. The Hall ICs 62 are arranged in the rear housing 20 such that the Hall ICs 62 are opposed to the magnet 61 to sense the magnetism generated from the magnet 61. The Hall ICs 62 are supported on a circuit board 63, which is fixed in the rear housing 20.

Next, the SBW ECU 7 will be described with reference to FIG. 2.

The SBW ECU 7, which control the power supply to the motor 5, has a microcomputer of a know type, which includes a CPU, a storage device (a memory, such as a ROM, an SRAM, an EEPROM, a RAM), an input circuit, an output circuit and a power supply circuit. The CPU performs various control operations and computing operations. The storage device stores various programs and data. A coil drive circuit of the motor 5 may be installed in a case, which receives the SBW ECU 7, or may be installed outside of the case of the SBW ECU 7.

In FIG. 2, numeral 71 indicates a start switch (e.g., an ignition switch, an accessory switch), and numeral 72 indicates a vehicle battery. Furthermore, numeral 73 indicates a display device, which displays the state of the shift range change apparatus to an occupant of the vehicle. In addition, numeral 74 indicates a vehicle speed sensor, and numeral 75 indicates other sensors, such as a shift range sensor (shift range manipulating means) for sensing the shift range set by the occupant, a brake switch, which sense the state of the vehicle.

The SBW ECU 7 is provided with various control programs, which implement functions of a rotor reading means, a normal control means and an abutment control means. The rotor reading means is for obtaining a rotational speed, the number of rotations per unit time and a rotational angle of the motor 5. The normal control means is for controlling the motor 5 to coincide a shift range position, which is recognized by the SBW ECU 7, with a position that is set through the shift range manipulating means, which is manipulated by the occupant. The abutment control means is for providing information, which enables the SBW ECU 7 to recognize the reference position of the motor 5.

The normal control means is a control program for setting the shift range. Specifically, the normal control means determines the rotational direction, the number of rotations per unit time and the rotational angle of the motor 5 based on the operational position (shift range) of the shift range manipulating means, which is manipulated by the occupant. Then, based on the determined result, the normal control means controls the power supply to the exciting coils 22 of the multiple phases to control the rotational direction, the number of rotations per unit time and the rotational angle of the motor 5. Specifically, at the time of rotating the motor 5, the SBW ECU 7 executes a synchronous operation, in which the power supply state of the exciting coils 22 of the multiple phases is changed based on, for example, the rotational angle of the rotor 11 that is sensed with the encoder 60 to control the rotational direction, the number of rotations per unit time and the rotational angle of the motor 5 and thereby to control the change in the shift range change mechanism 3 and the change in the parking change mechanism 4 through the speed reducer 6.

The abutment control means is a learning program. Specifically, the abutment control means supplies the electric power to the motor 5 to move and hit a movable member of the shift range change mechanism 3 against one extreme limit position (e.g., a parking side movable limit position) in a movable range of the movable member to let the SBW ECU 7 to identify the reference position (one rotational position in the movable range of the motor 5) every time when the operation starts (every time when the start switch 71 is turned on), or every time when the start of the operation is repeated for a predetermined number of times, or when the set position of the shift at the time of starting the operation is unknown, or when a predetermined learning condition is satisfied. The abutment control means stops the abutment control operation when the abutment control operation is executed for a predetermined time period, or when the change in the rotational angle of the rotor 11, which is read from the encoder 60, stops for a predetermined time period, or when a reference position of the motor 5 is recognized by the SBW ECU 7.

In general, an electrical resistivity of metal increases when the temperature increases. Similarly, an electric resistance of the motor 5 becomes high under the high temperature and becomes low under the low temperature. A battery voltage, which is applied to the motor 5, may become high or low depending on the condition of the battery 72 or the driving state of the vehicle.

Accordingly, in the high temperature and low battery voltage state, the drive current of the motor 5 becomes minimum (high temperature×low voltage=minimum drive current).

Here, it is demanded that the motor 5 of the SBW actuator 1 generates the required torque even under the worst condition of "high temperature×low voltage state=minimum drive current".

However, when the required torque is ensured in the worst condition of "high temperature×low voltage=minimum drive current", a large rotational torque would be produced in the opposite condition of "low temperature×high voltage=maximum drive current".

Therefore, when the abutment control operation is executed at the time of "low temperature×high voltage" to move and hit the movable member of the shift range change mechanism 3 against the one limit position in the movable range of the movable member, the shift range change mechanism 3 is locked. In this locked state, the motor 5 tries to drive the locked shift range change mechanism 3, so that an excessive output torque (excessive load) is applied to the rotation transmission system, which is from the motor 5 to the drive subject (the shift range change mechanism 3 and the parking change mechanism 4). Therefore, a mechanical damage may possibly be applied to the speed reducer 6, the components (e.g., the engaging portion 47a of the detent spring 47) of the rotation transmission system, and/or the engaged portions between the movable members and the stationary members.

In order to avoid the above disadvantage, the shift range change apparatus of the present embodiment adapts the following technique.

The motor 5 includes an annular resilient member 80. The annular resilient member 80 is resiliently deformed to enable tilting of the rotor shaft 13 when a decentering force is applied to the rotor shaft 13.

The motor 5 includes a supportive contact member. A rotatable member, which rotates integrally with the rotor shaft 13, contacts the supportive contact member when the rotor shaft 13 is tilted.

The above characteristics will be described in detail with reference to FIGS. 1A and 1B.

The rotor shaft 13 is rotatably supported by the first bearing 15 and the second bearing 16, which are provided to different axial locations (rear side and front side). The resilient member 80 is interposed between the rear housing 20 (corresponding to a stationary member, which supports the first bearing 15) and the first bearing 15.

The first bearing 15 has a known structure and thereby includes an inner race, an outer race, rolling members (e.g., balls) and annular plates. The annular plates close a front side and a rear side of the rolling members to limit outflow of grease from the interior. When an inner peripheral surface of the inner race is securely press fitted to a rear end outer peripheral surface of the rotor shaft 13, the first bearing 15 is installed to the rotor shaft 13.

The resilient member 80 is resiliently deformable at least in a radial direction of the rotor shaft 13. The resilient member 80 may be a cylindrical body made of resiliently deformable resin (e.g., rubber) or a cylindrical metal spring (e.g., wave washer).

The resilient member 80 is placed in a compressed state between an outer peripheral surface of the first bearing 15 (specifically, an outer peripheral surface of the outer race) and an inner peripheral surface of a shaft supporting boss hole of the rear housing 20 (specifically, an inner peripheral surface of a tubular boss portion formed generally at a center portion of a metal base frame 20b, which is molded in the resin 20a in the rear housing 20).

In the motor 5, when the resilient member 80 is resiliently deformed in the radial direction and is thereby tilted by a predetermined amount, the rotatable member, which rotates integrally with the rotor shaft 13, contacts the supportive contact member.

In this instance, the rotatable member is the rotor core 14, and the supportive contact member is the stator core 21. When the rotor shaft 13 is tilted by the predetermined amount, the outer peripheral edges of the rotor teeth of the rotor core 14 contact the inner peripheral edges of the stator teeth of the stator core 21 to limit the rotational torque generated in the rotor shaft 13.

When the amount of contact between the rotor core 14 and the stator core 21 is relatively small, the rotor core 14 and the stator core 21 make the light frictional engagement therebetween, so that the rotational torque is limited. Then, when the degree of tilt of the rotor shaft 13 is increased, the amount of contact between the rotor core 14 and the stator core 21 is increased, so that the rotational torque of the rotor shaft 13 is further limited. Then, when the degree of tilt of the rotor shaft 13 is further increased, the rotor core 14 is locked by the stator core 21, so that the rotation of the rotor shaft 13 is stopped.

The resilient force of the resilient member 80 in the radial direction is set such that the contact between the rotor core 14 and the stator core 21 begins when a torsional force, which is caused by the reaction force of the speed reducer 6 (specifically, the reaction force of the load induced by the engagement between the sun gear 26 and the ring gear 27), is applied to the rotor shaft 13 at the time of exerting the excessive rotational torque to the rotor shaft 13 of the motor 5 upon the locking of the movable member of the shift range change mechanism 3 at the one limit position in the movable range of the movable member at the time of executing the abutment control operation under the condition of "low temperature×high voltage=maximum drive current".

In order to facilitate understanding of this concept, a specific example is given here. For example, it is assumed that the preset variable operational temperature range of the SBW actuator 1 is −40 to 120 degrees Celsius, and the preset variable operational battery voltage range of the SBW actuator 1 is 10 to 15 V. In such a case, the resilient force of the resilient member 80 in the radial direction is set to cause starting of the contact between the rotor core 14 and the stator core 21 under the temperature of 100 degrees Celsius and the voltage of 14 V.

In the motor 5 of the SBW actuator 1, when the excessive rotational torque (excessive load) is applied to the rotor shaft 13, for example, at the time of executing the abutment control operation under the condition of "low temperature×high voltage=maximum drive current" or at the time of application of the unexpected excessive load to the output shaft 17 of the SBW actuator 1, the torsional force applied to the rotor shaft 13 is increased to cause an increase in the decentering force applied to the rotor shaft 13. Thus, the rotor shaft 13 resiliently deform and tilt the resilient member 80, so that the outer peripheral edges of the rotor teeth contact the inner peripheral edges of the stator teeth. When the rotor teeth contact the stator teeth, a portion of the rotational torque generated by the motor 5 is received by the rigid stator core 21 through the rigid rotor core 14, so that the rotational torque exerted on the rotor shaft 13 is limited.

Specifically, even when the movable member of the shift range change mechanism 3 is locked upon hitting the one limit position in the rotatable range of the movable member at the time of executing the abutment control operation under the condition of "low temperature×high voltage=maximum drive current", the torque of the motor 5 can be limited. Therefore, it is possible to avoid the disadvantageous application of a mechanical damage to the speed reducer 6, the components (e.g., the engaging portion 47a of the detent spring 47) of the rotation transmission system, and/or the engaged portions between the movable members and the stationary members.

Also, the torque of the motor 5 can be limited by contacting the rotor core 14 to the stator core 21 at the time of generation of the excessive load by adapting the simple structure of interposing the annular resilient member 80 between the first bearing 15 and the rear housing 20. That is, with the simple structure, the generation of the excessive load can be limited, and the reliability of shift range change apparatus can be improved.

Now, modifications of the above embodiment will be described.

Figure 5:
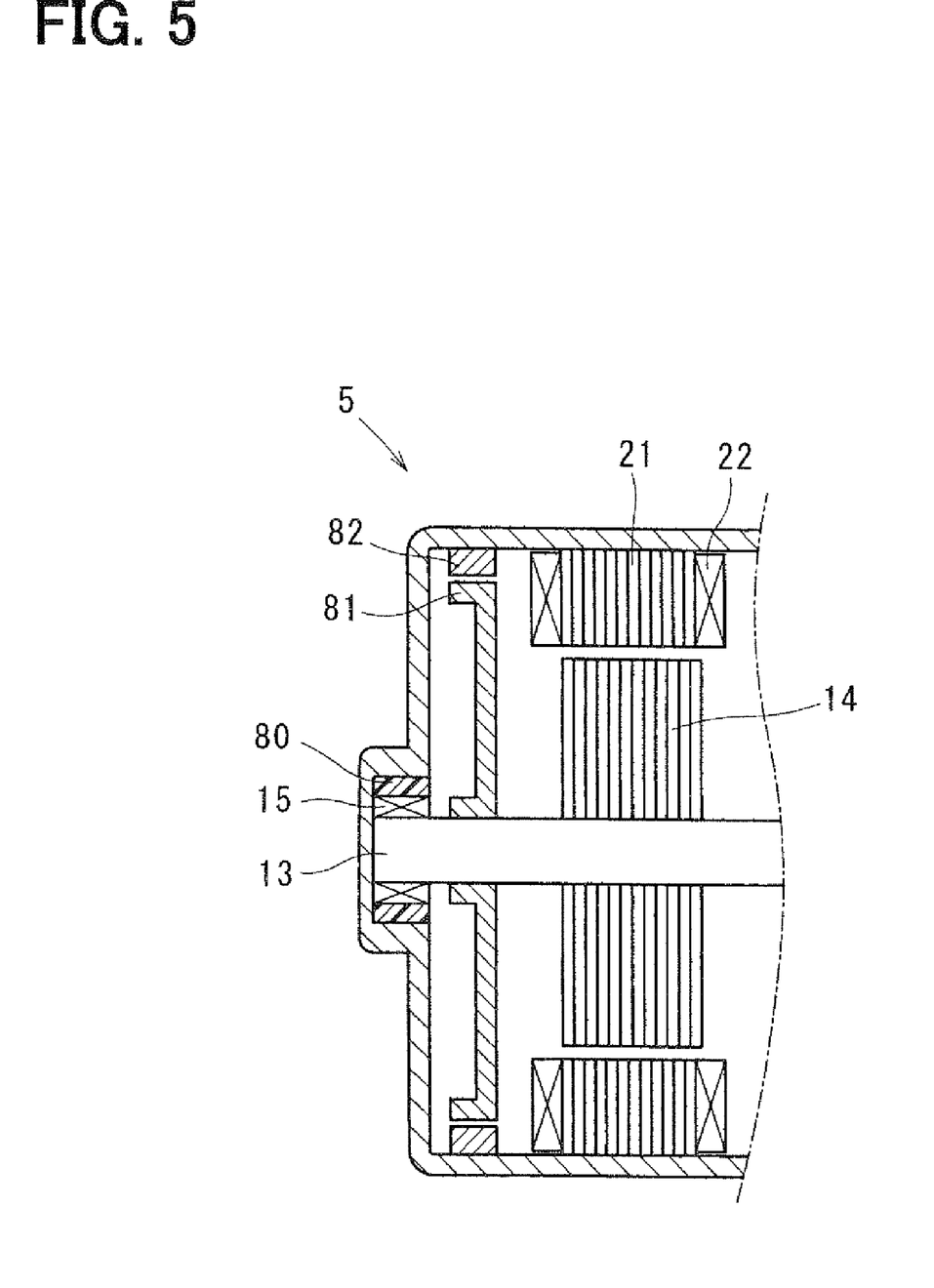
FIG. 5 is a partial schematic cross sectional view showing a modification of the electric motor of the embodiment.

In the above embodiment, when the rotor shaft 13 is tilted, the rotor core 14 contacts the stator core 21 to limit the rotational torque exerted on the rotor shaft 13. Alternatively, as shown in FIG. 5, a rotatable frictional member 81 may be provided to the rotor shaft 13 separately from the rotor core 14, and a stationary frictional member 82 may be provided to the housing separately from the stator core 21. In such a case, when the rotor shaft 13 is tilted, an outer peripheral edge of the rotatable frictional member 81 contacts an inner peripheral edge of the stationary frictional member 82 to limit the rotational torque exerted on the rotor shaft 13. Also, the inner peripheral surface of the housing of the motor 5 (the housing of the SBW actuator 1) may be used as the stationary frictional member 82.

Figure 6:
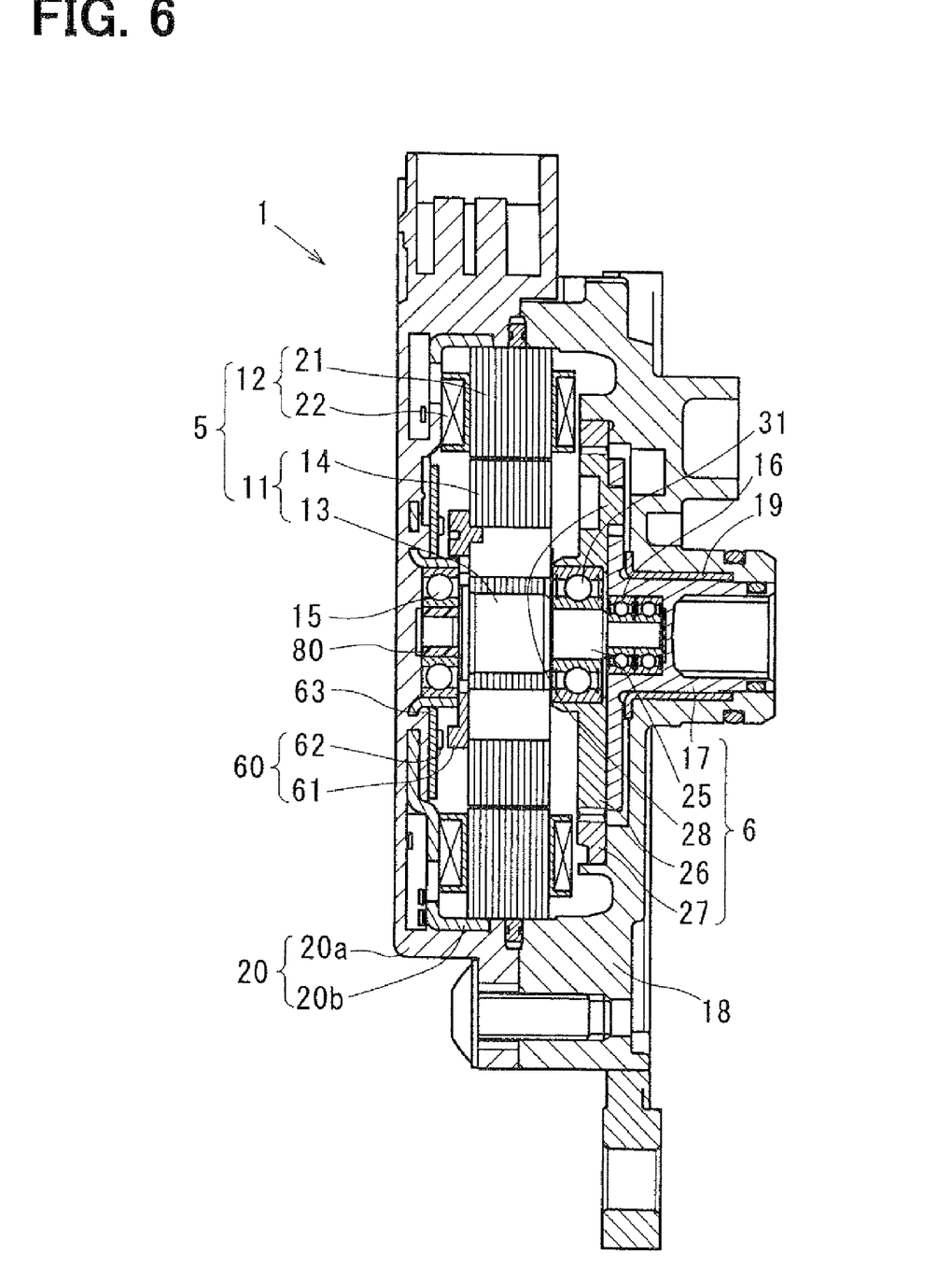
FIG. 6 is an axial cross-sectional view showing a modification of the SBW actuator shown in FIG. 1B.

In the above embodiment, the resilient member 80 is interposed between the first bearing 15 and the rear housing 20 (specifically, the cylindrical boss portion of the base frame 20b). Alternatively, the resilient member 80 may be interposed between the rotor shaft 13 and the first bearing 15, as shown in FIG. 6.

In the above embodiment, the present invention is applied to the motor 5 of the shift range change apparatus. However, the drive subject of the motor 5 is not limited to the above one. That is, the present invention may be applied to an electric motor of any other use (e.g., a vehicular motor, such as a vehicle driving electric motor, a vehicle refrigerant compressor drive electric motor, a wiper drive electric motor as well as an electric motor of a manufacturing apparatus, a robot arm drive electric motor). Furthermore, the present invention may be applied to any type of motor (e.g., an AC motor, a DC motor). Also, the present invention may be applied to an electric motor having no speed reducer.

Additional advantages and modifications will readily occur to those skilled in the art. The invention in its broader terms is therefore not limited to the specific details, representative apparatus, and illustrative examples shown and described.

What is claimed is:

1. An electric motor comprising:
    a rotor shaft that is rotated upon energization of the electric motor;
    a rotatable member that is rotated integrally with the rotor shaft;
    a resilient member that enables tilting or decentering of the rotor shaft in a radial direction of the rotor shaft upon application of a decentering force on the rotor shaft;
    a supportive contact member that contacts the rotatable member when the rotor shaft is tilted or decentered; and
    first and second bearings, which rotatably support the rotor shaft at two different axial locations, respectively, wherein:

the resilient member is interposed between a stationary member, which supports the first bearing, and the first bearing or between the rotor shaft and the first bearing; and the resilient member is resiliently deformable in the radial direction of the rotor shaft.

2. The electric motor according to claim 1, wherein:

the rotatable member is a rotor core;

the supportive contact member is a stator core; and when the rotor shaft is tilted or decentered, the rotor core contacts the stator core to limit a rotational torque of the rotor shaft.

3. The electric motor according to claim 1, further comprising:

a rotor core that is fixed to the rotor shaft to rotate integrally with the rotor shaft; and a stator core that is radially opposed to the rotor core, wherein:

the rotatable member is a rotatable frictional member, which is provided separately from the rotor core;

the supportive contact member is a stationary frictional member, which is provided separately from the stator core; and when the rotor shaft is tilted or decentered, the rotatable frictional member contacts the stationary frictional member to limit a rotational torque of the rotor shaft.

4. The electric motor according to claim 1, wherein the electric motor is coupled with a speed reducer, which reduces a speed of a rotational output of the electric motor, to drive a shift range change mechanism installed in a vehicle automatic transmission.

5. The electric motor according to claim 1, further comprising a bearing that rotatably supports one axial end portion of the rotor shaft, wherein the resilient member is a cylindrical body, which is made of a resin material and is placed radially outward of the bearing to directly contact with the bearing and to continuously surround the bearing.

6. An actuator comprising:

the electric motor of claim 1; and a speed reducer that reduces a speed of a rotational output of the electric motor.

7. An electric motor comprising:

a rotor shaft that is rotated upon energization of the electric motor;

a rotatable member that is rotated integrally with the rotor shaft;

a resilient member that enables tilting or decentering of the rotor shaft upon application of a decentering force on the rotor shaft; and a supportive contact member that contacts the rotatable member when the rotor shaft is tilted or decentered, wherein:

the rotatable member is a rotor core;

the supportive contact member is a stator core; and when the rotor shaft is tilted or decentered, the rotor core contacts the stator core to limit a rotational torque of the rotor shaft.

8. The electric motor according to claim 7, further comprising first and second bearings, which rotatably support the rotor shaft at two different axial locations, respectively, wherein:

the resilient member is interposed between a stationary member, which supports the first bearing, and the first bearing or between the rotor shaft and the first bearing; and the resilient member is resiliently deformable in a radial direction of the rotor shaft.

9. The electric motor according to claim 7, wherein the electric motor is coupled with a speed reducer, which reduces a speed of a rotational output of the electric motor, to drive a shift range change mechanism installed in a vehicle automatic transmission.

10. The electric motor according to claim 7, further comprising a bearing that rotatably supports one axial end portion of the rotor shaft, wherein the resilient member is a cylindrical body, which is made of a resin material and is placed radially outward of the bearing to directly contact with the bearing and to continuously surround the bearing.

* * * * *